（12） United States Patent
Zhao

(10) Patent No.: US 12,041,647 B2
(45) Date of Patent: Jul. 16, 2024

(54) METHOD AND DEVICE FOR DETERMINING AND CONFIGURING SCHEDULING REQUEST RESOURCE, AND STORAGE MEDIUM

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 510 days.

(21) Appl. No.: 17/267,470

(22) PCT Filed: Jun. 14, 2019

(86) PCT No.: PCT/CN2019/091290
§ 371 (c)(1),
(2) Date: Feb. 9, 2021

(87) PCT Pub. No.: WO2020/034740
PCT Pub. Date: Feb. 20, 2020

(65) Prior Publication Data
US 2021/0298040 A1    Sep. 23, 2021

(30) Foreign Application Priority Data
Aug. 16, 2018 (CN) .......................... 201810934283.5

(51) Int. Cl.
*H04W 72/543* (2023.01)
(52) U.S. Cl.
CPC ................................. *H04W 72/543* (2023.01)
(58) Field of Classification Search
None
See application file for complete search history.

(56) References Cited

U.S. PATENT DOCUMENTS

2013/0028221 A1    1/2013 Seo et al.
2016/0044653 A1    2/2016 Bagheri et al.
(Continued)

FOREIGN PATENT DOCUMENTS

CN    104170493 A    11/2014
CN    106068670 A    11/2016
(Continued)

OTHER PUBLICATIONS

Nokia et al.,"Remaining issues on SR for sTTI", 3GPP TSG-RAN WG2 #100, Reno, USA, Nov. 27-Dec. 1, 2017, total 3 pages, R2-1712972.
(Continued)

*Primary Examiner* — Mohammad S Adhami
(74) *Attorney, Agent, or Firm* — Kilpatrick Townsend & Stockton LLP

(57) ABSTRACT

Disclosed are a method and device for determining and configuring a scheduling request resource, and a storage medium. The method comprises: a network side configuring a mapping relationship between a QoS parameter of a direct communication Sidelink interface and a scheduling request resource of a Uu interface; the network side notifying a terminal of the mapping relationship; the terminal receiving the mapping relationship, configured by the network side, between the QoS parameter of the direct communication Sidelink interface and the scheduling request resource of the Uu interface; and the terminal determining whether the Sidelink interface triggers a scheduling request, and if the scheduling request is triggered, determining, according to a QoS parameter of a logic channel of the Sidelink interface triggering the scheduling request and the mapping relationship, the scheduling request resource of the Uu interface to be used. According to the present application, when the terminal triggers the scheduling request, the terminal can (Continued)

determine which scheduling request resource is selected for sending, so that the problem of selecting the scheduling request resource triggered on a direct communication link is solved.

17 Claims, 4 Drawing Sheets

(56) References Cited

U.S. PATENT DOCUMENTS

| | | | | |
|---|---|---|---|---|
| 2017/0048745 | A1* | 2/2017 | Yi | H04W 72/21 |
| 2018/0255559 | A1* | 9/2018 | Lee | H04W 76/23 |
| 2020/0187220 | A1* | 6/2020 | Xiao | H04W 72/12 |
| 2021/0168832 | A1* | 6/2021 | Zhuo | H04W 72/566 |
| 2021/0274545 | A1* | 9/2021 | Adjakple | H04W 72/21 |

FOREIGN PATENT DOCUMENTS

| | | |
|---|---|---|
| CN | 107079530 A | 8/2017 |
| CN | 107950047 A | 4/2018 |
| JP | 2015520533 A | 7/2015 |
| WO | 2017026671 A1 | 2/2017 |
| WO | 2018031638 A1 | 2/2018 |
| WO | 2018075828 A1 | 4/2018 |

OTHER PUBLICATIONS

3GPP TS 23.285 V15.1.0, 3rd Generation Partnership Project;Technical Specification Group Services and System Aspects; Architecture enhancements for V2X services (Release 15), total 37 pages, Jun. 2018.

Panasonic,"SR issues for D2D communication", 3GPP TSG RAN WG2 Meeting #88, San Francisco, USA, Nov. 17-21, 2014, total 3 pages, R2-144885.

ZTE,"Discussion on QoS management", 3GPP TSG RAN WG1 Meeting #94, Gothenburg, Sweden, Aug. 20-24, 2018, total 3 pages, R1-1808608.

Huawei et al.,"SR enhancements with multiple numerologies", 3GPP TSG-RAN2 Meeting #98, Hangzhou, China, May 15-19, 2017, total 4 pages, R2-1705625.

Oppo,"Latency reduction in eV2x", 3GPP TSG-RAN2 Meeting #101 bis, Sanya, China, Apr. 16-Apr. 20, 2018, total 4 pages, R2-1804358(revision of R2-1801851).

3GPP TS 36.321 V15.2.0, 3rd Generation Partnership Project; Technical Specification Group Radio Access Network; Evolved Universal Terrestrial Radio Access (E-UTRA); Medium Access Control (MAC) protocol specification; Release 15; total 126 pages, Jul. 2018.

Nokia et al.,"Bearer and MAC CE mapping for eLAA",3GPP TSG-RAN WG2 Meeting #94, Nanjing, China, May 23-27, 2016, total 5 pages, R2-164053.

* cited by examiner

METHOD AND DEVICE FOR DETERMINING AND CONFIGURING SCHEDULING REQUEST RESOURCE, AND STORAGE MEDIUM

CROSS-REFERENCE OF RELATED APPLICATIONS

The application is a US National Stage of International Application No. PCT/CN2019/091290, filed Jun. 14, 2019, which claims priority to Chinese Patent Application No. 201810934283.5, filed with the Chinese Patent Office on Aug. 16, 2018 and entitled "Method, Device and Apparatus for Determining and Configuring Scheduling Request Resources", which is hereby incorporated by reference in its entirety.

FIELD

The application relates to the field of wireless communication technology, and in particular to a method and device for determining and configuring scheduling request resources, and a storage medium.

BACKGROUND

Firstly, the Scheduling Request (SR) mechanism of the Long Term Evolution (LTE) system is introduced as follows.

The LTE system is a scheduling-based system, where a base station allocates time-frequency resources required for data transmission to a user equipment, and the user equipment receives the downlink data or transmits the uplink data according to the scheduling command of the base station. The uplink data transmission is scheduled by the base station, and the base station scheduler can notify the user equipment through an uplink scheduling grant (UL grant) after determining the allocation situation of uplink resources. The base station scheduler allocates uplink resources based on the amount of uplink data to be transmitted by the user equipment, that is, the buffer status of the user equipment. The buffer is at the user equipment. If the base station wants to know the information, the user equipment needs to perform the Buffer Status Report (BSR) to the base station. The BSR classification and trigger mechanism in the LTE Rel-11 and previous versions is as follows.

Regular BSR: (1) it is triggered when the data with a higher priority than the data in the current buffer arrives or the data arrives in the buffer that is originally empty; (2) it is triggered when the retxBSR-Timer expires and there is data in the buffer.

Periodic BSR: the Periodic BSR is triggered when the periodicBSR-Timer expires.

Padding BSR: the Padding BSR can be triggered when a User Equipment (UE) has available resources in addition to the data that needs to be transmitted when organizing the Medium Access Control (MAC) Protocol Data Unit (PDU).

When the user equipment has a regular BSR to be triggered (the logical channel that triggers the regular BSR is not configured with SR masking) but the user equipment has no UL grant, an SR will be triggered.

After the SR is triggered, there are two ways to transmit the SR, namely: transmitting the SR through the dedicated scheduling request resource (D-SR) and transmitting the SR through a random access process (RA-SR).

Dedicated SR (D-SR): D-SR is allocated by Radio Resource Control (RRC) and carried by Physical Uplink Control Channel (PUCCH).

Random Access SR (RA-SR): using the random access process to transmit the SR.

The basic principle of transmitting SR is: the RA-SR is not used as long as there are D-SR resources. The RA-SR is used only when there is no D-SR resource configuration.

The SR of the New Radio (NR) system will be introduced as follows.

The physical layer of the NR system supports multiple numerologies/TTIs. The concepts of the baseband parameter (numerology) and Transmission Time Interval (TTI) are as follows.

Numerology is a term in 3GPP RAN1, and can be translated into baseband parameter. The main difference among different numerologies is that different numerologies support different Sub-Carrier Spacings (SCSs). For example, the sub-carrier spacings supported by the 5G NR system at least include: 15 KHz, 30 KHZ, 60 KHz, 120 kHz, and the numerologies corresponding to different sub-carrier spacings are independent numerologies. Generally, the numerology used by high-speed user equipment is different from the numerology used by low-speed user equipment; the numerologies at the high frequency and low frequency are also different. In addition to the speed and frequency related to the use of different numerologies, the industry also understands that the numerologies that can be used by different services may also be different, for example, the numerologies used by Ultra Reliable & Low Latency Communication (URLLC) and Enhanced Mobile Broadband (eMBB) may be different.

TTI is the transmission time interval. In the traditional LTE system, the TTI length is 1 ms. Starting from the LTE R14, in order to support the reduction in time delay, different TTI lengths have been introduced, such as one Orthogonal Frequency Division Multiplex (OFDM) symbol length. Different TTI lengths are used in 5G systems and can be applied to each numerology, that is, different numerologies in the 5G NR can use different TTI lengths or the same TTI length, and the TTI length used for different user equipments on a certain numerology at any one time can be dynamically changed. The selection of the TTI length is mainly related to the service delay. For example, for the URLLC service, the delay requirement it supports is relatively high, a shorter TTI length may be selected, such as TTI length of 1 OFDM symbol.

For the NR system, the numerology and/or TTI corresponding to a bearer/logical channel is/are configured through the network. The numerologies and/or TTIs corresponding to different logical channels may be the same or different. For the uplink, the SR information needs to be able to reflect the numerology and/or TTI corresponding to the logical channel that currently has a data transmission requirement, so that the network-side device can allocate reasonable uplink resources for the user equipment according to the SR. In order to achieve this goal, the design idea of the NR is as follows.

Multiple sets of SR configurations are introduced, the network side configures the correspondence between logical channels of the user equipment and SR configurations, and the network side configures the correspondence between logical channels and numerologies/TTIs.

The user equipment has an SR to be triggered, and then selects the SR configuration used for SR transmission to perform the SR transmission according to the logical channel that triggers the SR and the correspondence between logical channels and SR configurations configured by the network side.

The network side receives the SR, then determines the logical channel in which there is data to be transmitted according to the correspondence between logical channels and SR configurations configured by the network side, and then determines the numerology and/or TTI corresponding to the UL grant to perform reasonable scheduling. These SR configurations are respectively mapped to different PUCCH resources (different PUCCH resources refer to different time/frequency-domain resources occupied by PUCCHs).

The disadvantage of the prior art is: the NR system introduces multiple sets of SR configurations, the logical channels are configured by the network for Uu link, and the network may configure the mapping relationship between logical channels and SR configurations for the user equipment. Thus, when the user equipment has an SR to be triggered, the user equipment firstly determines which logical channel triggered the SR, and then determines the SR configuration to be used by the user equipment according to the logical channel that triggered the SR and the mapping relationship between logical channels and SR configurations.

For the direct communication/direct link (Sidelink), unlike the Uu link, the logical channels of the Sidelink are established by the user equipment itself, so the user equipment does not know which set of SR resources should be selected for transmission when the Regular Sidelink BSR of the user equipment triggers the SR.

SUMMARY

The application provides a method and device for determining and configuring scheduling request resource, and a storage medium, so as to solve the problem that a user equipment does not know which set of SR resource should be selected for transmission when the user equipment triggers an SR.

Based on the foregoing problem, in an first aspect, an embodiment of the application provides a method for determining SR resource, including:
  receiving, by a user equipment, a mapping relationship between QoS parameters of a Sidelink interface and SR resources of a Uu interface configured by a network side;
  determining, by the user equipment, whether the Sidelink interface triggers an SR, and when the SR is triggered, then determining a SR resource of the Uu interface to be used according to QoS parameters of a logical channel of the Sidelink interface that triggers the SR and the mapping relationship.

In an implementation, the mapping relationship received by the user equipment is configured respectively based on each destination identifier.

In an implementation, the QoS parameters of the Sidelink interface are one or a combination of:
  PPPP, PPPR, PDB, other QoS parameters introduced for the Sidelink interface in subsequent protocol versions of R15.

In an implementation, the SR resource is a time/frequency-domain resource, or a time/frequency-domain resource indicated by a time/frequency-domain resource index.

In an implementation, determining, by the user equipment, whether the Sidelink interface triggers the SR includes:
  determining that the SR is triggered when the user equipment has a Regular Sidelink BSR to be triggered and has no available uplink resource.

In an implementation, the SR resource allocation mode on the Uu interface is:
  on Uu interface, a SR resource used for the Uu interface and a SR resource used for the Sidelink interface are not distinguished in a time domain and/or frequency domain; or
  on Uu interface, a SR resource used for the Uu interface and a SR resource used for the Sidelink interface are isolated in a time domain and/or frequency domain.

In an implementation, the method further includes:
  reporting, by the user equipment, auxiliary information to the network side, wherein the auxiliary information is used by the network side to configure the mapping relationship.

In an implementation, the auxiliary information includes one or a combination of:
  QoS parameters corresponding to a current logical channel of the Sidelink interface of the user equipment; or
  QoS parameters corresponding to a current logical channel of the Sidelink interface of the user equipment and a Sidelink Destination ID.

In an implementation, determining, by the user equipment, whether the Sidelink interface triggers the SR, and when the SR is triggered, then determining the SR resource of the Uu interface to be used according to QoS parameters of a service of the Sidelink interface that triggers the SR and the mapping relationship, includes:
  when the mapping relationship between QoS parameters of the Sidelink interface and SR resources of the Uu interface configured by the network side is configured respectively based on each destination identifier, then determining a corresponding destination identifier according to the Sidelink logical channel that triggers the SR, and determining the SR resource to be used according to a mapping relationship between QoS parameters corresponding to the destination identifier and SR resources of the Uu interface.

In an implementation, determining the SR resource of the Uu interface to be used according to QoS parameters of a service of the Sidelink interface that triggers the SR and the mapping relationship, includes:
  when a Regular Sidelink BSR is triggered by expiry of a retxBSR-Timer, then selecting a Sidelink logical channel that has data to be transmitted currently and has a highest priority as the logical channel of the Sidelink interface that triggers the SR.

In an implementation, when the user equipment has a plurality of Sidelink logical channels that trigger SRs and the plurality of Sidelink logical channels correspond to different SR resources, the SR resource is selected in one of the following ways:
  when multiple SR resources are allowed to be selected, using different SR resources corresponding to the plurality of Sidelink logical channels for SRs; or
  when only one SR resource is allowed to be used, selecting according to a following principle:
  selecting a Sidelink logical channel that triggers an SR currently and has a highest priority, and determining the SR resource according to QoS parameters of the selected Sidelink logical channel and the mapping relationship; or, after selecting QoS parameters of a Sidelink logical channel that triggers an SR currently, selecting a SR resource closest to the current time among SR resources corresponding to the selected QoS parameters.

In a second aspect, an embodiment of the application provides a method for configuring SR transmitting resource, including:
configuring, by a network side, a mapping relationship between QoS parameters of a Sidelink interface and SR resources of a Uu interface;
notifying, by the network side, the mapping relationship to the user equipment, wherein the mapping relationship is used by the user equipment to determine a resource for transmitting an SR.

In an implementation, the mapping relationship is configured respectively based on each destination identifier.

In an implementation, the QoS parameters of the Sidelink interface are one or a combination of:
PPPP, PPPR, PDB, other QoS parameters introduced for the Sidelink interface in subsequent protocol versions of R15.

In an implementation, the SR resource is a time/frequency-domain resource, or a time/frequency-domain resource indicated by a time/frequency-domain resource index.

In an implementation, the SR resource allocation mode on the Uu interface is:
on Uu interface, a SR resource used for the Uu interface and a SR resource used for the Sidelink interface are not distinguished in the time domain and/or frequency domain; or
on Un interface, a SR resource used for the Uu interface and a SR resource used for the Sidelink interface are isolated in the time domain and/or frequency domain.

In an implementation, the method further includes:
after receiving auxiliary information reported by the user equipment to the network side, configuring, by the network side, the mapping relationship based on the auxiliary information.

In an implementation, the auxiliary information includes one or a combination of:
QoS parameters corresponding to a current logical channel of the Sidelink interface of the user equipment; or
QoS parameters corresponding to a current logical channel of the Sidelink interface of the user equipment and a Sidelink Destination ID.

In a third aspect, an embodiment of the application provides a user equipment, including:
a processor configured to read programs in a memory to perform the process of:
after receiving a mapping relationship between QoS parameters of a Sidelink interface and SR resources of a Uu interface configured by a network side, determining whether the Sidelink interface triggers an SR, and when the SR is triggered, then determining a SR resource of the Uu interface to be used according to QoS parameters of a logical channel of the Sidelink interface that triggers the SR and the mapping relationship;
a transceiver configured to receive and transmit data under control of the processor.

In an implementation, the received mapping relationship is configured respectively based on each destination identifier.

In an implementation, the QoS parameters of the Sidelink interface are one or a combination of:
PPPP, PPPR, PDB, other QoS parameters introduced for the Sidelink interface in subsequent protocol versions of R15.

In an implementation, the SR resource is a time/frequency-domain resource, or is a time/frequency-domain resource indicated by a time/frequency-domain resource index.

In an implementation, determining whether the Sidelink interface triggers the SR includes:
determining that the SR is triggered when the user equipment has a Regular Sidelink BSR to be triggered and has no available uplink resource.

In an implementation, the SR resource allocation mode on the Uu interface is:
on Uu interface, a SR resource used for the Uu interface and a SR resource used for the Sidelink interface are not distinguished in the time domain and/or frequency domain; or
on Uu interface, a SR resource used for the Uu interface and a SR resource used for the Sidelink interface are isolated in the time domain and/or frequency domain.

In an implementation, the process further includes:
reporting auxiliary information to the network side, wherein the auxiliary information is used by the network side to configure the mapping relationship.

In an implementation, the auxiliary information includes one or a combination of:
QoS parameters corresponding to a current logical channel of the Sidelink interface of the user equipment; or
QoS parameters corresponding to a current logical channel of the Sidelink interface of the user equipment and a Sidelink Destination ID.

In an implementation, determining whether the Sidelink interface triggers the SR, and when the SR is triggered, then determining the SR resource of the Uu interface to be used according to QoS parameters of a service of the Sidelink interface that triggers the SR and the mapping relationship includes:
when the mapping relationship between QoS parameters of the Sidelink interface and SR resources of the Uu interface configured by the network side is configured respectively based on each destination identifier, then determining a corresponding destination identifier according to the Sidelink logical channel that triggers the SR, and determining the SR resource to be used according to a mapping relationship between QoS parameters corresponding to the destination identifier and SR resources of the Uu interface.

In an implementation, determining the SR resource of the Uu interface to be used according to QoS parameters of a service of the Sidelink interface that triggers the SR and the mapping relationship, includes:
when a Regular Sidelink BSR is triggered by expiry of a retxBSR-Timer, then selecting a Sidelink logical channel that has data to be transmitted currently and has a highest priority as the logical channel of the Sidelink interface that triggers the SR.

In an implementation, when the user equipment has a plurality of Sidelink logical channels that trigger SRs and the plurality of Sidelink logical channels correspond to different SR resources, the SR resource is selected in one of the following ways:
when multiple SR resources are allowed to be selected, using different SR resources corresponding to these Sidelink logical channels for SRs; or
when only one SR resource is allowed to be used, selecting according to a following principle:
selecting a Sidelink logical channel that triggers an SR currently and has a highest priority, and determining the SR resource according to QoS parameters of the selected Sidelink logical channel and the mapping relationship; or, after selecting QoS parameters of a Sidelink logical channel that triggers an SR currently, selecting the SR resource closest to the current time among SR resources corresponding to the selected QoS parameters.

In a fourth aspect, an embodiment of the application provides a base station, including:
a processor configured to read programs in a memory to perform the process of:
configuring a mapping relationship between QoS parameters of a Sidelink interface and SR resources of a Uu interface;
a transceiver configured to receive and transmit data under control of the processor to perform the process of:
notifying the mapping relationship to a user equipment, wherein the mapping relationship is used by the user equipment to determine a resource for transmitting an SR.

In an implementation, the mapping relationship is configured respectively based on each destination identifier.

In an implementation, the QoS parameters of the Sidelink interface are one or a combination of:
PPPP, PPPR, PDB, other QoS parameters introduced for the Sidelink interface in subsequent protocol versions of R15.

In an implementation, the SR resource is a time/frequency-domain resource, or a time/frequency-domain resource indicated by a time/frequency-domain resource index.

In an implementation, the SR resource allocation mode on the Uu interface is:
on Uu interface, a SR resource used for the Uu interface and a SR resource used for the Sidelink interface are not distinguished in the time domain and/or frequency domain; or
on Uu interface, a SR resource used for the Uu interface and a SR resource used for the Sidelink interface are isolated in the time domain and/or frequency domain.

In an implementation, the process further includes:
after receiving auxiliary information reported by the user equipment to the network side, configuring the mapping relationship based on the auxiliary information.

In an implementation, the auxiliary information includes one or a combination of:
QoS parameters corresponding to a current logical channel of the Sidelink interface of the user equipment; or
QoS parameters corresponding to a current logical channel of the Sidelink interface of the user equipment and a Sidelink Destination ID.

In a fifth aspect, an embodiment of the application provides a user equipment, including:
a receiving device configured to receive a mapping relationship between QoS parameters of a Sidelink interface and SR resources of a Uu interface configured by a network side;
a determining device configured to determine whether the Sidelink interface triggers an SR, and when the SR is triggered, then determine a SR resource of the Uu interface to be used according to QoS parameters of a logical channel of the Sidelink interface that triggers the SR and the mapping relationship.

In a sixth aspect, an embodiment of the application provides a base station, including:
a configuration device configured to configure a mapping relationship between QoS parameters of a Sidelink interface and SR resources of a Uu interface;
a notification device configured to notify the mapping relationship to a user equipment, wherein the mapping relationship is used by the user equipment to determine a resource for transmitting an SR.

In a seventh aspect, an embodiment of the application provides a computer readable storage medium storing a computer program that, when executed by a processor, causes the process to perform the steps performed by the user equipment or the steps performed by the base station.

The application has the following beneficial effects.

The embodiments of the application, the network side may configure the mapping relationship between QoS parameters of the Sidelink interface and SR resources of the Uu interface, and transmit the mapping relationship to the user equipment, so that the user equipment can determine the SR resource on the Uu interface based on this mapping relationship combined with the QoS parameters of the logical channel of the Sidelink interface when determining that the SR is triggered, and then transmit on this resource. Therefore, after the user equipment triggers the SR, the user equipment can determine which set of SR resource is selected for transmission, thereby solving the problem of resource selection for the SR triggered on the Sidelink link.

BRIEF DESCRIPTION OF THE DRAWINGS

The accompanying drawings illustrated here are used to provide the further understanding of the application and constitute a part of the application, and the schematic embodiments of the application and the illustration thereof are used to explain the application but not limit the application improperly.

DETAILED DESCRIPTION

The NR system introduces multiple sets of SR configurations, the logical channels are configured by the network for the Uu link, and the network may configure the mapping relationship between logical channels and SR configurations for the user equipment. Thus, when the user equipment has an SR to be triggered, the user equipment firstly determines which logical channel triggers the SR, and then determines the SR configuration to be used by the user equipment according to the logical channel that triggers the SR and the mapping relationship between logical channels and SR configurations.

For the Sidelink, unlike the Uu link, the logical channels of the Sidelink are established by the user equipment itself, so the user equipment does not know which set of SR resources should be selected for transmission when the Regular Sidelink BSR of the user equipment triggers the SR. Based on this, the embodiments of the application provides a solution for determining scheduling request resources of the Sidelink interface, which is mainly used to solve the problem of SR resource selection triggered by the Regular BSR on the Sidelink link. The solution provided in the embodiments of the application is mainly: the network side configures a mapping relationship between Quality of Service (QoS) parameter/QoS parameter combinations of the Sidelink interface and SR resources of the Uu interface. Then, after the regular BSR of the Sidelink interface of the user equipment triggers the SR, the user equipment selects the suitable SR resources for transmission on the Uu interface according to the QoS parameters of the Sidelink interface that triggers the regular BSR.

The embodiments of the application will be illustrated below in combination with the drawings.

In the illustration process, the implementations at the user equipment and base station sides will be illustrated respectively, and then the instance implemented by both of them in cooperation is also given to better understand the implementations of the solution provided in the embodiments of the application. Such illustration does not mean they must implement in cooperation or must implement alone. Actually, when the user equipment and the base station implement separately, they also solve the problems at the user equipment side and the base station side respectively, while the better effect may be obtained when they are used in combination.

Figure 1:
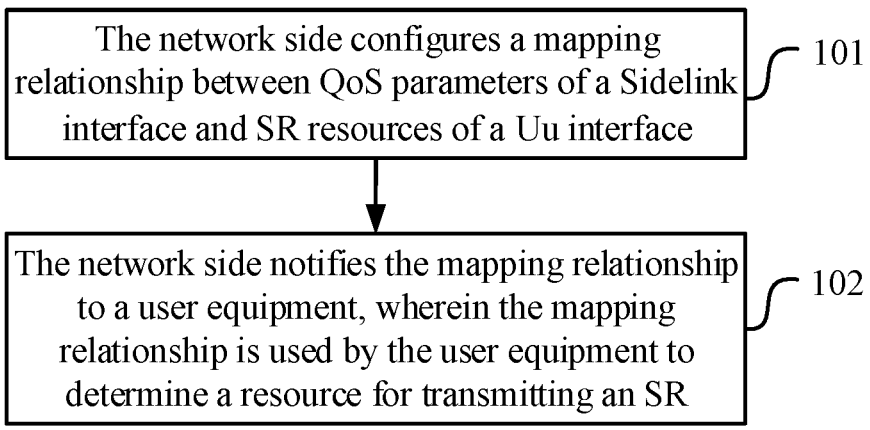
FIG. 1 is a schematic diagram of a method for configuring SR transmitting resource on the network side according to an embodiment of the application.

FIG. 1 is a schematic diagram of a method for configuring SR sending resources on the network side. As shown, the method may include the following steps.

Step 101: the network side configures a mapping relationship between QoS parameters of a Sidelink interface and SR resources of a Uu interface.

Step 102: the network side notifies the mapping relationship to the user equipment, the mapping relationship is used by the user equipment to determine a resource for transmitting an SR.

Correspondingly, the followings are on the user equipment.

Figure 2:
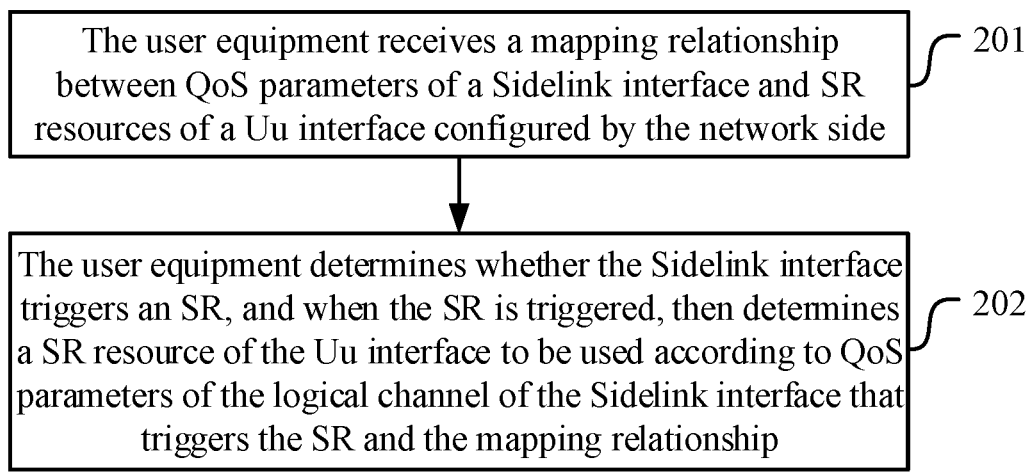
FIG. 2 is a schematic diagram of a method for determining SR resource of a user equipment according to an embodiment of the application.

FIG. 2 is a schematic diagram of a method for determining SR resource of the user equipment. As shown, the method may include the following steps.

Step 201: the user equipment receives a mapping relationship between QoS parameters of a Sidelink interface and SR resources of a Uu interface configured by the network side.

Step 202: the user equipment determines whether the Sidelink interface triggers an SR, and when the SR is triggered, then determines a SR resource of the Uu interface to be used according to QoS parameter of the logical channel of the Sidelink interface that triggers the SR and the mapping relationship.

In this way, the user equipment can transmit the SR to the network side on the determined SR resource.

Since there is a certain correspondence between the network side and the user equipment in implementations, the following description is mainly based on the user equipment. The implementations of the opposite end according to the correspondence between two sides.

In an implementation, the mapping relationship received by the user equipment is configured respectively based on each destination identifier.

In an implementation, the QoS parameters of the Sidelink interface are one or a combination of:
PPPP, PPPR, PDB, other QoS parameters introduced for the Sidelink interface in subsequent protocol versions of R15.

Specifically, the QoS parameters of the Sidelink interface can be but not limited to one or a combination of:
ProSe Per-Packet Priority (PPPP) of the Sidelink interface;
ProSe Per-Packet Reliability (PPPR) of the Sidelink interface;
Packet Delay Budget (PDB);
QoS parameters introduced newly by subsequent protocols for the Sidelink interface.

When combined, it can also be embodied as: a combination of parameters, a combination of specific values of different parameters, and a combination of different values of the same parameter. Various forms of combinations can be determined as needed as long as various combinations can form a mapping relationship with SR resources so that the user equipment can determine the SR resource for transmitting the SR.

For details, please refer to the related implementation illustration of the first embodiment and first table as well as the related implementation illustration of the second embodiment and second table described below.

In an implementation, the SR resource is a specific time/frequency-domain resource, or refer to a time/frequency-domain resource indicated by a time/frequency-domain resource index.

Specifically, the expression form of SR resource can be a time/frequency resource, or a time/frequency resource index.

In an implementation, the step in which the user equipment determines whether the Sidelink interface triggers the SR may include:
determining that the SR is triggered when the user equipment has a Regular Sidelink BSR to be triggered and has no available uplink resource.

In an implementation, the SR resource allocation mode of the Uu interface is:
on the Un interface, a SR resource used for the Uu interface and a SR resource used for the Sidelink interface are not distinguished in the time domain and/or frequency domain; or
on the Uu interface, a SR resource used for the Uu interface and a SR resource used for the Sidelink interface are isolated in the time domain and/or frequency domain.

Specifically, there are two ways to allocate SR resources on the Uu interface.

Option 1: on the Un interface, a SR resource used for the Uu interface and a SR resource used for the Sidelink interface are not distinguished in the time domain and/or frequency domain.

Option 2: on the Un interface, a SR resource used for the Uu interface and a SR resource used for the Sidelink interface are isolated in the time domain and/or frequency domain, to facilitate the network to distinguish service priorities.

In an implementation, the method may further include:
the user equipment reports the auxiliary information used by the network side to configure the mapping relationship to the network side.

In an implementation, the auxiliary information includes one or a combination of:
QoS parameters corresponding to a current logical channel of the Sidelink interface of the user equipment; or
QoS parameters corresponding to a current logical channel of the Sidelink interface of the user equipment and a Sidelink Destination ID.

Specifically, when the network side configures the mapping relationship between QoS parameters of the Sidelink interface and SR resources of the Uu interface, there may be two following ways.

Option A: the network side configures the mapping relationship between all possible QoS parameters/QoS parameter combinations of the Sidelink interface and SR resources of the Uu interface. In this way, the user equipment does not need to report the auxiliary information.

Option B: the user equipment reports the auxiliary information, and the network side configures the mapping relationship between QoS parameters/QoS parameter combinations of the current service of the Sidelink interface and SR resources of the Uu interface based on the auxiliary information reported by the user equipment.

In the Option B, the content of the auxiliary information reported by the user equipment may be one or a combination of the followings.

QoS parameters corresponding to the current service of the Sidelink interface of the user equipment.

The network cannot distinguish the destinations using different configurations when configuring the mapping relationship between QoS parameters/QoS parameter combinations of the Sidelink interface and SR resources of the Uu interface based on this auxiliary information.

QoS parameters corresponding to the current service of the Sidelink interface of the user equipment and a Sidelink Destination ID.

In this way, the network can distinguish the destinations using different configurations when configuring the mapping relationship between QoS parameters/QoS parameter combinations of the Sidelink interface and SR resources of the Uu interface based on this auxiliary information.

In an implementation, the step in which the user equipment determines whether the Sidelink interface triggers an SR, and when the SR is triggered, then determines the SR resource of the Uu interface to be used according to QoS parameters of the service of the Sidelink interface that triggers the SR and the mapping relationship, includes:
when the mapping relationship between QoS parameters of the Sidelink interface and SR resources of the Uu interface configured by the network side is configured respectively based on each destination identifier, then determining a corresponding destination identifier according to the Sidelink logical channel that triggers the SR, and determining the SR resource to be used according to a mapping relationship between QoS parameters corresponding to the destination identifier and SR resources of the Uu interface.

In an implementation, the step of determining the SR resource of the Uu interface to be used according to QoS parameters of the service of the Sidelink interface that triggers the SR and the mapping relationship, includes:
when a Regular Sidelink BSR is triggered by expiry of a retxBSR-Timer, then selecting a Sidelink logical channel that has data to be transmitted currently and has the highest priority as the logical channel of the Sidelink interface that triggers the SR.

In an implementation, when the user equipment has a plurality of Sidelink logical channels that trigger SRs and these Sidelink logical channels correspond to different SR resources, the SR resource is selected in one of the following ways:
when multiple SR resources are allowed to be selected, using different SR resources corresponding to these Sidelink logical channels for SRs; or
when only one SR resource is allowed to be used, selecting according to a following principle:
selecting a Sidelink logical channel that triggers an SR currently and has a highest priority, and determining the SR resource according to its QoS parameters and the mapping relationship; or, after selecting QoS parameters of a Sidelink logical channel that triggers an SR currently, selecting the SR resource closest to the current time among SR resources corresponding to the selected QoS parameters.

Specifically, the SR resource selection mode may be as follows.

When the SR resources distinguish Destination IDs, there is a need to firstly select a Destination ID according to the Sidelink logical channel that triggers the SR, and then perform the following process according to the QoS parameters and SR configuration under the Destination ID; otherwise, the following process is directly performed.

For the Sidelink BSR, when the Regular Sidelink BSR is triggered due to the expiry of a retxBSR-Timer, then the SR resource corresponding to the QoS parameters corresponding to the Sidelink logical channel that has data to be transmitted currently and has the highest priority is selected.

When the user equipment has a plurality of Sidelink logical channels that trigger SRs and these Sidelink logical channels correspond to different SR resources, the SR resource can be selected in one of the following ways:
allowing multiple SR resources to be selected, that is, using different SR resources corresponding to these Sidelink logical channels for SRs respectively;
allowing only one set of SR resources to be used, and selecting according to the following principle:
selecting a Sidelink logical channel that triggers an SR currently and has the highest priority, and determining the SR resource according to QoS parameters of the selected Sidelink logical channel and the mapping relationship;
selecting QoS parameters of a Sidelink logical channel that triggers an SR currently, and then selecting the SR resource closest to the current time among SR resources corresponding to the selected QoS parameters. The following description will be given through an example of cooperation of the network side with the user equipment.

First Embodiment

Figure 3:
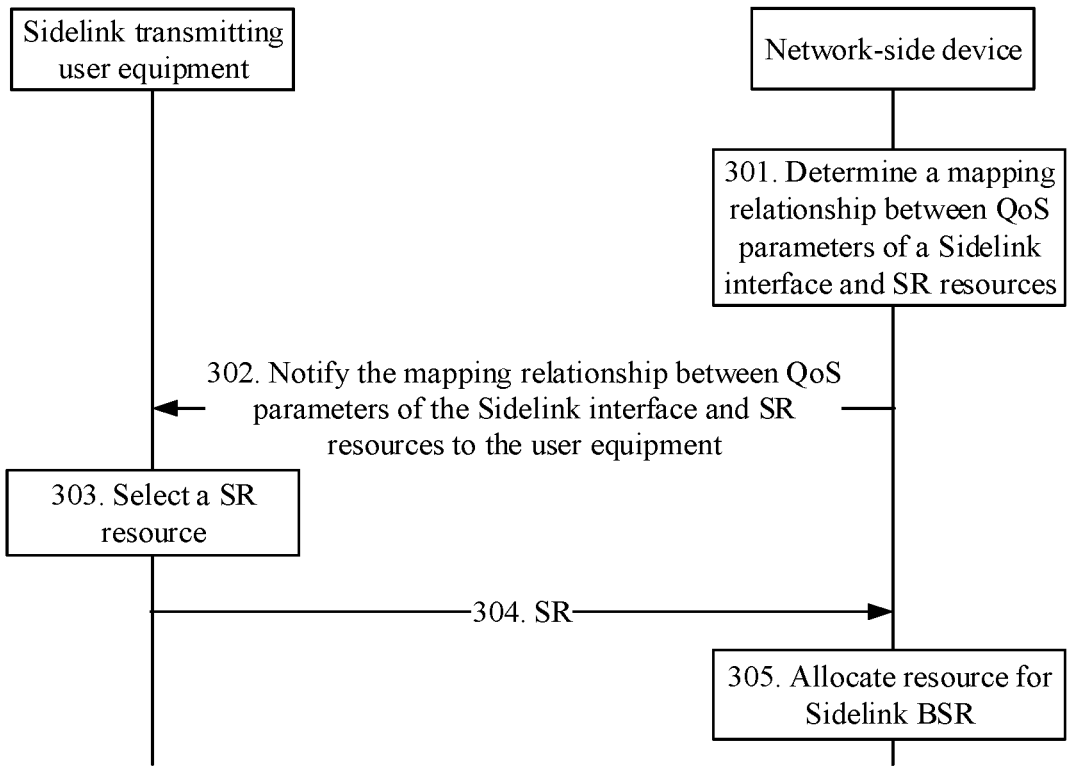
FIG. 3 is a schematic diagram of the SR processing flow when the user equipment is not required to report the auxiliary information according to an embodiment of the application.

FIG. 3 is a schematic diagram of the SR processing flow when the user equipment is not required to report the auxiliary information. As shown, the SR processing flow can be as follows.

Step 301: the network side determines a mapping relationship between QoS parameters of a Sidelink interface and SR resources.

Specifically, the network side configures a mapping relationship between QoS parameters/QoS parameter combinations of the Sidelink interface and SR resources of the Uu interface.

The SR resource of the Uu interface may be a specific time/frequency resource, or a time/frequency resource index. There are two ways to divide the resources.

Option 1: on the Uu interface, the SR resource used for the Uu interface and the SR resource used for the Sidelink interface are not distinguished in the time/frequency domain.

Option 2: on the Uu interface, the SR resource used for the Uu interface and SR resource used for the Sidelink interface are distinguished in the time/frequency domain, to facilitate the network to distinguish service priorities.

The network side determines and configures the mapping relationship between all possible QoS parameters/QoS parameter combinations of the Sidelink interface and SR resources of the Uu interface.

The QoS parameters of the Sidelink interface can be but not limited to one or a combination of:

PPPP, PPPR, PDB, QoS parameters introduced newly by subsequent protocols for the Sidelink interface.

The QoS parameter information of the Sidelink logical channel may be the PPPP and/or PPPR and/or PDB, and may also be other Sidelink-related QoS parameters introduced newly.

Taking the PPPP being the QoS parameter as an example, and assuming that the PPPP has 8 levels, the network side can configure: PPPP=1/2 uses the SR resource 1; PPPP=3/4 uses the SR resource 2; PPPP=5/6 uses the SR resource 3; PPPP=7/8 uses the SR resource 4.

Taking the PPPP/PPPR combination being the QoS parameter as an example, it is assumed that the PPPP and PPPR have 4 levels respectively. The network side can perform the configurations as shown in Table 1.

In an implementation, it may also be a combination of different values of the same parameter, which can be determined as needed as long as various combinations can form a mapping relationship with SR resources so that the user equipment can determine the SR resource for transmitting the SR.

TABLE 1

| PPPP/PPPR combination | | |
| --- | --- | --- |
| PPPP | PPPR | SR resource |
| ½ | ½ | 1 |
| ½ | ¾ | 2 |
| ¾ | ½ | 3 |
| ¾ | ¾ | 4 |

Step 302: the network side notifies the mapping relationship between QoS parameters of the Sidelink interface and SR resources to the user equipment.

Specifically, the network side may notify the configuration relationship between QoS parameters of the Sidelink interface and SR resources to the user equipment through dedicated signaling. The SR resources in the configuration signaling can be time/frequency resources or SR resource indexes.

Step 303: the user equipment selects a SR resource.

Specifically, the user equipment determines according to the trigger condition of the Regular BSR to trigger SR when the Regular Sidelink BSR is triggered but there is no uplink resource of the Uu interface to carry the resources of the Sidelink BSR. Once the SR is triggered, the SR resource can be selected as follows.

For the Sidelink BSR, when the Regular Sidelink BSR is triggered due to the expiry of a retxBSR-Timer, then the SR resource, corresponding to the QoS parameters corresponding to the Sidelink logical channel that has data to be transmitted currently and has the highest priority, is selected.

If the user equipment has a plurality of Sidelink logical channels that trigger SRs and these Sidelink logical channels correspond to different SR resources, the SR resource can be selected in one of the following ways:

allowing multiple SR resources to be selected, that is, using different SR resources corresponding to these Sidelink logical channels for SRs respectively;

allowing only one set of SR resource to be used, and then selecting according to the following principle:

selecting a Sidelink logical channel that triggers an SR currently and has the highest priority, and determining the SR resource according to QoS parameters the selected Sidelink logical channel and the mapping relationship;

selecting QoS parameters of a Sidelink logical channel that triggers an SR currently, and then selecting the SR resource closest to the current time the selected SR resources corresponding to these QoS parameters.

Step 304: report the SR.

Step 305: allocate resource for the Sidelink BSR.

The network side device allocates appropriate resource to the Sidelink BSR according to the SR reported by the user equipment.

Second Embodiment

Figure 4:
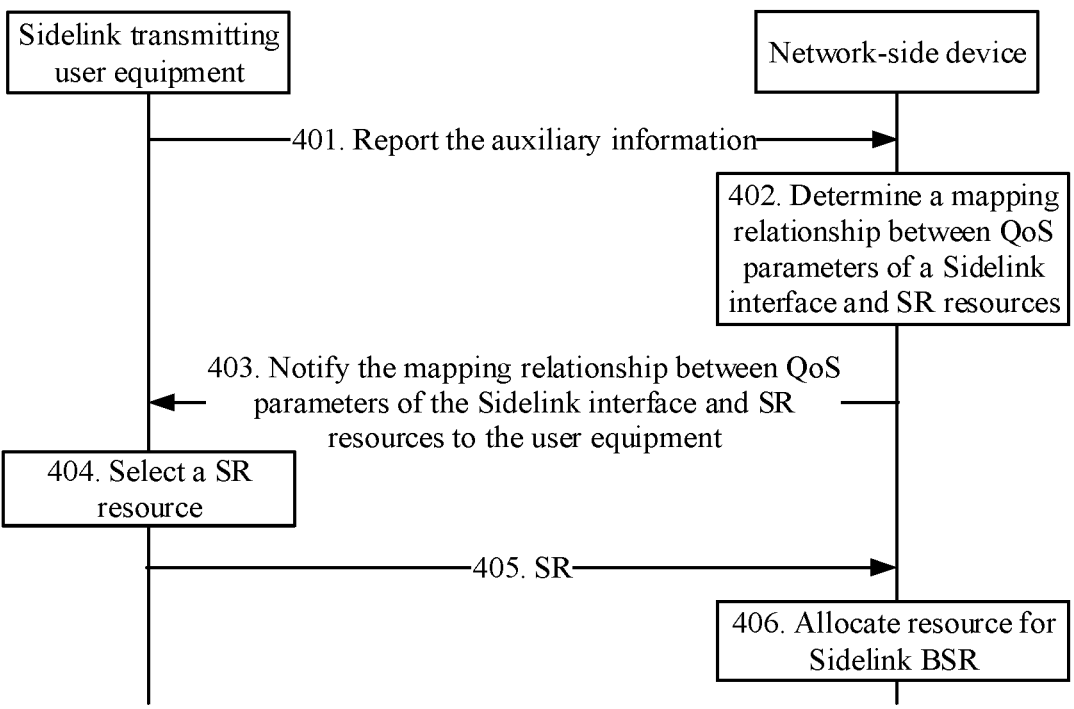
FIG. 4 is a schematic diagram of the SR processing flow when the user equipment reports the auxiliary information according to an embodiment of the application.

FIG. 4 is a schematic diagram of the SR processing flow when the user equipment reports the auxiliary information. As shown, the SR processing flow can be as follows.

Step 401: the user equipment reports the auxiliary information.

Specifically, the content of the auxiliary information reported by the user equipment may be one or a combination of:

QoS parameters corresponding to the current service of the Sidelink interface of the user equipment;

QoS parameters corresponding to the current service of the Sidelink interface of the user equipment and a Destination ID.

Step 402: the network side determines a mapping relationship between QoS parameters of the Sidelink interface and SR resources.

Specifically, the network side configures a mapping relationship between QoS parameters/QoS parameter combinations of the Sidelink interface and SR resources of the Uu interface.

The SR resources of the Uu interface may be specific time/frequency resources, or the time/frequency resource indexes. There are two ways to divide the resources.

Option 1: on Uu interface, a SR resource used for the Uu interface and a SR resource used for the Sidelink interface are not distinguished in the time/frequency domain.

Option 2: on Uu interface, a SR resource used for the Uu interface and a SR resource used for the Sidelink interface are isolated in the time/frequency domain, to facilitate the network to distinguish service priorities.

The network side configures the mapping relationship between QoS parameters/QoS parameter combinations of the current service of the Sidelink interface and SR resources of the Uu interface based on the auxiliary information reported by the user equipment. Based on different auxiliary information reported by the user equipment, the network-side behaviors can be different.

The auxiliary information reported by the user equipment is: QoS parameters corresponding to the current service of the Sidelink interface of the user equipment.

The network cannot distinguish the destinations using different configurations when configuring the mapping relationship between QoS parameters/QoS parameter combinations of the Sidelink interface and SR resources of the Uu interface based on this auxiliary information.

The auxiliary information reported by the user equipment is: QoS parameters corresponding to the current service of the Sidelink interface of the user equipment and a Destination ID.

The network can distinguish the destinations using different configurations when configuring the mapping relationship between QoS parameters/QoS parameter combinations of the Sidelink interface and SR resources of the Uu interface based on this auxiliary information.

The QoS parameters of the Sidelink interface can be but not limited to one or a combination of:

PPPP, PPPR, PDB, QoS parameters introduced newly by subsequent protocols for the Sidelink interface.

The QoS parameter information of the Sidelink logical channel may be the PPPP and/or PPPR and/or PDB, and may also be other Sidelink-related QoS parameters introduced newly.

Taking the case that the PPPP is the QoS parameter and SR resource configurations do not distinguish Destination IDs as an example, and assuming that the PPPP has 8 levels, the network side can configure: PPPP=1/2 uses the SR resource 1; PPPP=3/4 uses the SR resource 2; PPPP=5/6 uses the SR resource 3; PPPP=7/8 uses the SR resource 4.

Taking the PPPP/PPPR combination being the QoS parameter as an example, it is assumed that the PPPP and PPPR have 4 levels respect timely. The network side can perform the configurations as shown in Table 2.

In an implementation, it may also be a combination of different values of the same parameter, which can be determined as needed as long as various combinations can form a mapping relationship with SR resources so that the user equipment can determine the SR resource for transmitting the SR.

TABLE 2

PPPP/PPPR combination

| PPPP | PPPR | SR resource |
|---|---|---|
| 1/2 | 1/2 | 1 |
| 1/2 | 3/4 | 2 |
| 3/4 | 1/2 | 3 |
| 3/4 | 3/4 | 4 |

Step 403: the network side notifies the mapping relationship between QoS parameters of the Sidelink interface and SR resources to the user equipment.

Specifically, the network side notifies the configuration relationship between QoS parameters of the Sidelink interface and SR resources to the user equipment through dedicated signaling. The SR resources in the configuration signaling can be time/frequency resources or SR resource indexes.

Step 404: the user equipment selects a SR resource.

Specifically, the user equipment determines according to the trigger condition of the Regular BSR: when the Regular Sidelink BSR is triggered but there is no uplink resource of the Uu interface to carry the resources of the Sidelink BSR, the SR is triggered. Once the SR is triggered, the SR resource need to be selected.

When the SR resources distinguish Destination IDs, there is a need to firstly select a Destination ID according to the Sidelink logical channel that triggers the SR. Then the following process is performed according to the QoS parameters and SR configuration under the Destination ID; otherwise, the following process is directly performed.

For the Sidelink BSR, when the Regular Sidelink BSR is triggered due to the expiry of a retxBSR-Timer, then the SR resource corresponding to the QoS parameters corresponding to the Sidelink logical channel that has data to be transmitted currently and has the highest priority is selected.

When the user equipment has a plurality of Sidelink logical channels that trigger SRs and these Sidelink logical channels correspond to different SR resources, the SR resource can be selected in one of the following ways:

allowing multiple SR resources to be selected, that is, using different SR resources corresponding to these Sidelink logical channels for SRs respectively;

allowing only one set of SR resource to be used, and then selecting according to the following principle:

selecting a Sidelink logical channel that triggers an SR currently and has the highest priority, and determining the SR resource according to its QoS parameters and the mapping relationship;

selecting QoS parameters of a Sidelink logical channel that triggers an SR currently, and then selecting the SR resource closest to the current time among SR resources corresponding to the selected QoS parameters.

Step 405: the user equipment reports the SR.

Step 406: the network side allocates resource for the Sidelink BSR.

The network side device allocates appropriate resource to the Sidelink BSR according to the SR reported by the user equipment.

Based upon the same inventive concept, the embodiments of the application further provide user equipments and base stations. Since the principles solving the problem of these devices are similar to the method for determining SR resources and the method for configuring SR transmitting resource, the implementations of these devices can refer to the implementations of the methods, and the repeated description thereof will be omitted here.

The embodiment of the application is implemented, it may be implemented in such way as follows.

Figure 5:
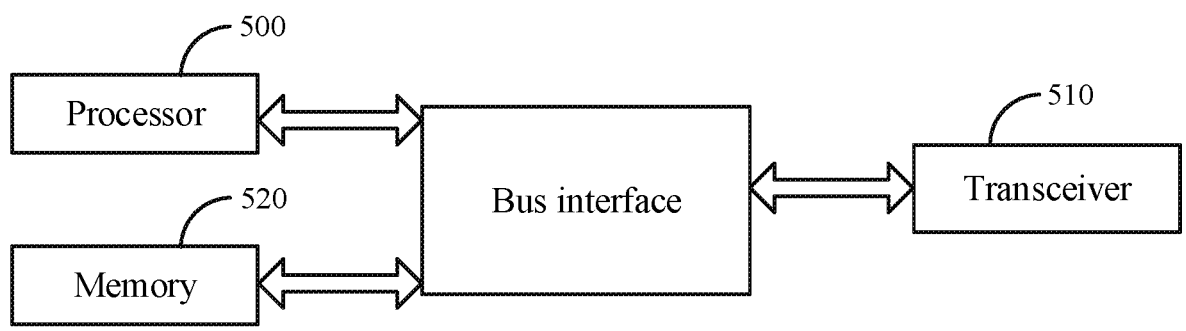
FIG. 5 is a schematic structural diagram of a first base station according to an embodiment of the application.

FIG. 5 is a schematic structural diagram of a first base station provided by an embodiment of the application. As shown, the base station includes:

a processor 500 configured to read the programs in a memory 520 to perform the process of:

configuring a mapping relationship between QoS parameters of a Sidelink interface and SR resources of a Uu interface;

a transceiver 510 configured to receive and transmit the data under the control of the processor 500 to perform the processes of:

notifying the mapping relationship to a user equipment, wherein the mapping relationship is used by the user equipment to determine a resource for transmitting an SR.

In an implementation, the mapping relationship is configured respectively based on each destination identifier.

In an implementation, the QoS parameters of the Sidelink interface are one or a combination of:
  PPPP, PPPR, PDB, other QoS parameters introduced for the Sidelink interface in subsequent protocol versions of R15.

In an implementation, the SR resource is a specific time/frequency-domain resource, or a time/frequency-domain resource indicated by a time/frequency-domain resource index.

In an implementation, the SR resource allocation mode on the Uu interface is:
  on Uu interface, a SR resource used for the Uu interface and a SR resource used for the Sidelink interface are not distinguished in the time domain and/or frequency domain; or
  on Uu interface, a SR resource used for the Uu interface and a SR resource used for the Sidelink interface are isolated in the time domain and/or frequency domain.

In an implementation, the process further includes:
  after receiving the auxiliary information reported by the user equipment to the network side, configuring the mapping relationship based on the auxiliary information.

In an implementation, the auxiliary information includes one or a combination of:
  QoS parameters corresponding to a current logical channel of the Sidelink interface of the user equipment; or
  QoS parameters corresponding to a current logical channel of the Sidelink interface of the user equipment and a Sidelink Destination ID.

In FIG. 5, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

Figure 6:
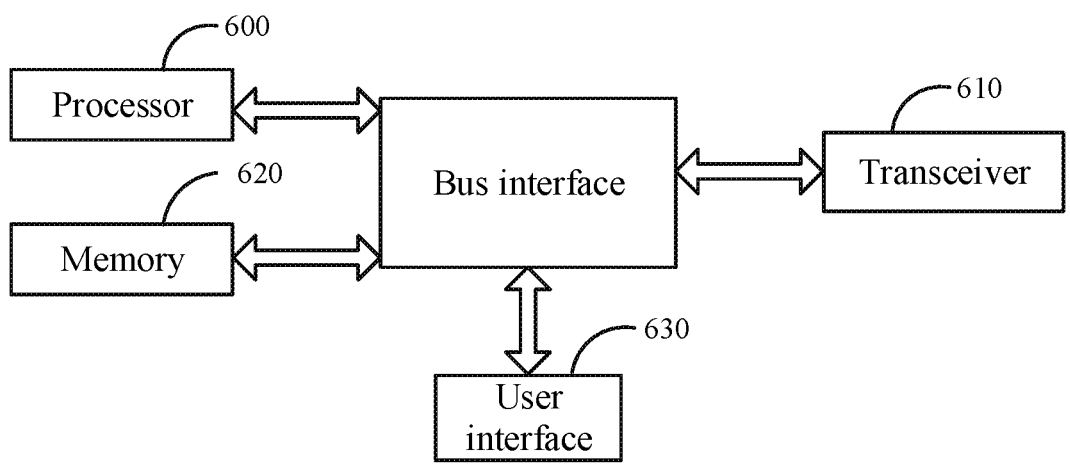
FIG. 6 is a schematic structural diagram of a first user equipment according to an embodiment of the application.

FIG. 6 is a schematic structural diagram of a first user equipment according to an embodiment of the application. As shown, the user equipment includes:
  a processor 600 configured to read the programs in a memory 620 to perform the process of:
    after receiving a mapping relationship between QoS parameters of a Sidelink interface and SR resources of a Uu interface configured by a network side, determining whether the Sidelink interface triggers an SR, and when the SR is triggered, then determining a SR resource of the Uu interface to be used according to QoS parameters of a logical channel of the Sidelink interface that triggers the SR and the mapping relationship;
  a transceiver 610 configured to receive and transmit the data under the control of the processor 600.

In an implementation, the received mapping relationship is configured respectively based on each destination identifier.

In an implementation, the QoS parameters of the Sidelink interface are one or a combination of:
  PPPP, PPPR, PDB, other QoS parameters introduced for the Sidelink interface in subsequent protocol versions of R15.

In an implementation, the SR resources are specific time/frequency-domain resources, or time/frequency-domain resources indicated by time/frequency-domain resource indexes.

In an implementation, determining whether the Sidelink interface triggers the SR includes:
  determining that the SR is triggered when the user equipment has a Regular Sidelink BSR to be triggered and has no available uplink resource.

In an implementation, the SR resource allocation mode on the Uu interface is:
  on Uu interface, a SR resource used for the Uu interface and a SR resource used for the Sidelink interface are not distinguished in the time domain and/or frequency domain; or
  a SR resource used for the Uu interface and a SR resource used for the Sidelink interface are isolated in the time domain and/or frequency domain.

In an implementation, the process further includes:
  reporting the auxiliary information to the network side, wherein the auxiliary information is used by the network side to configure the mapping relationship.

In an implementation, the auxiliary information includes one or a combination of:
  QoS parameters corresponding to a current logical channel of the Sidelink interface of the user equipment; or
  QoS parameters corresponding to a current logical channel of the Sidelink interface of the user equipment and a Sidelink Destination ID.

In an implementation, determining whether the Sidelink interface triggers the SR, and when the SR is triggered, then determining the SR resource of the Uu interface to be used according to QoS parameters of a service of the Sidelink interface that triggers the SR and the mapping relationship, includes:
  when the mapping relationship between QoS parameters of the Sidelink interface and SR resources of the Uu interface configured by the network side is configured respectively based on each destination identifier, then determining a corresponding destination identifier according to the Sidelink logical channel that triggers the SR, and determining the SR resource to be used according to a mapping relationship between QoS parameters corresponding to the destination identifier and SR resources of the Uu interface.

In an implementation, determining the SR resource of the Uu interface to be used according to QoS parameters of a service of the Sidelink interface that triggers the SR and the mapping relationship, includes:
  when a Regular Sidelink BSR is triggered by expiry of a retxBSR-Timer, then selecting a Sidelink logical channel that has data to be transmitted currently and has a highest priority as the logical channel of the Sidelink interface that triggers the SR.

In an implementation, when the user equipment has a plurality of Sidelink logical channels that trigger SRs and these Sidelink logical channels correspond to different SR resources, SR resource is selected in one of the following ways:
  when multiple SR resources are allowed to be selected, using different SR resources corresponding to these Sidelink logical channels for SRs; or when only one SR resource is allowed to be used, selecting according to a following principle:

selecting a Sidelink logical channel that triggers an SR currently and has a highest priority, and determining the SR resource according to its QoS parameters and the mapping relationship; or, after selecting QoS parameters of a Sidelink logical channel that triggers an SR currently, selecting the SR resource closest to the current time among SR resources corresponding to the selected QoS parameters.

In FIG. 6, the bus architecture can include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the units for communicating with various other devices over the transmission media. For different user equipments, the user interface 630 may also be the interface capable of inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

Figure 7:
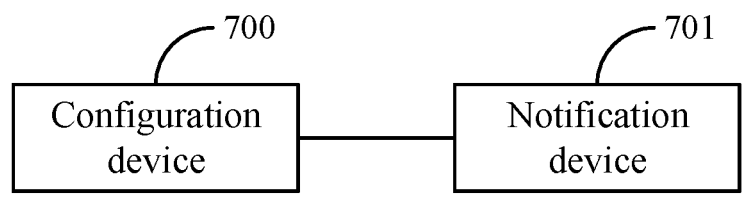
FIG. 7 is a schematic diagram of a second base station according to an embodiment of the application.

As shown in FIG. 7, an embodiment of the application further provides a second base station, including:
 a configuration device 700 configured to configure a mapping relationship between QoS parameters of a Sidelink interface and SR resources of a Uu interface;
 a notification device 701 configured to notify the mapping relationship to a user equipment, wherein the mapping relationship is used by the user equipment to determine a resource for transmitting an SR.

Specific implementations can refer to the implementations of the method for configuring SR transmitting resource described above.

Figure 8:
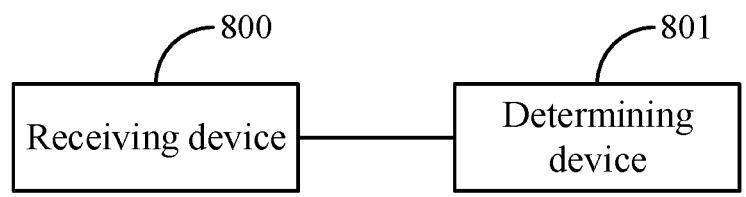
FIG. 8 is a schematic diagram of a second user equipment according to an embodiment of the application.

As shown in FIG. 8, an embodiment of the application further provides a second user equipment, including:
 a receiving device 800 configured to receive a mapping relationship between QoS parameters of a Sidelink interface and SR resources of a Uu interface configured by a network side;
 a determining device 801 configured to determine whether the Sidelink interface triggers an SR, and when the SR is triggered, then determine a SR resource of the Uu interface to be used according to QoS parameters of a logical channel of the Sidelink interface that triggers the SR and the mapping relationship.

Specific implementations can refer to the implementations of the method for determining SR resource described above.

For the sake of description, all the parts of the above device are divided into various devices or units by function, which are described respectively. Of course, the functions of the various devices or units may be implemented in the same one or more software or hardware when the application is implemented.

To sum up, the embodiments of the application, the mapping relationship between QoS parameters/QoS parameter combinations of the Sidelink interface and SR resources of the Uu interface is configured on the network side. After the regular BSR of the Sidelink interface of the user equipment triggers the SR, the user equipment selects the suitable SR resource for transmission on the Uu interface according to the QoS parameters of the Sidelink interface that triggers the regular BSR.

Specifically, there are also provided the SR resource allocation mode on the Uu interface; two configuration modes of the mapping relationship between QoS parameters of the Uu interface and SR resources; the content of the reported auxiliary information when the user equipment is required to report the auxiliary information; the SR resource selection process of the user equipment, etc.

The embodiments of the application provides a scheduling request transmitting solution, which can solve the problem of SR resource selection triggered by the Regular BSR on the Sidelink link.

An embodiment of the invention further provides a computing device readable storage medium for the method for determining SR resource, that is, the content is not lost after power off. The storage medium stores a software program including program codes, and when the program codes run on a computing device, the software program can implement any above solution of the user equipment for determining SR resource of the embodiments of the invention when it is read and executed by one or more processors.

An embodiment of the invention further provides a computing device readable storage medium for the method for configuring SR transmitting resource, that is, the content is not lost after power off. The storage medium stores a software program including program codes, and when the program codes run on a computing device, the software program can implement any above solution of the network side for configuring SR transmitting resource of the embodiments of the invention when it is read and executed by one or more processors.

It should be understood that the embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

What is claimed is:

1. A method for determining Scheduling Request, SR, resource, comprising:
   receiving, by a user equipment, a mapping relationship between Quality of Service, QoS, parameters of a Sidelink interface and SR resources of a Uu interface configured by a network side;
   determining, by the user equipment, whether the Sidelink interface triggers an SR, and when the SR is triggered, then determining an SR resource of the Uu interface to be used according to a logical channel of the Sidelink interface that triggers the SR and the mapping relationship;
   wherein the mapping relationship received by the user equipment is a mapping relationship between QoS parameters corresponding to a destination identifier and SR resources of the Uu interface;
   wherein determining the SR resource of the Uu interface to be used according to the logical channel of the Sidelink interface that triggers the SR and the mapping relationship, comprises:
   determining a corresponding destination identifier according to a Sidelink logical channel that triggers the SR, and determining the SR resource to be used according to a mapping relationship between QoS parameters corresponding to the destination identifier and SR resources of the Uu interface.

2. The method of claim 1, wherein the QoS parameters of the Sidelink interface are one or a combination of:
   ProSe Per-Packet Priority, PPPP, of the Sidelink interface; ProSe Per-Packet Reliability, PPPR, of the Sidelink interface; data Packet Delay Budget, PDB, of the Sidelink interface; other QoS parameters introduced for the Sidelink interface in subsequent protocol versions of R15.

3. The method of claim 1, wherein the SR resource is a time/frequency-domain resource, or a time/frequency-domain resource indicated by a time/frequency-domain resource index.

4. The method of claim 1, wherein determining, by the user equipment, whether the Sidelink interface triggers the SR, comprises:
   determining that the SR is triggered when the user equipment has a Regular Sidelink Buffer Status Report, BSR, to be triggered and has no available uplink resource.

5. The method of claim 1, wherein an SR resource allocation mode on the Uu interface is:
   on Uu interface, a SR resource used for the Uu interface and a SR resource used for the Sidelink interface are not distinguished in a time domain and/or frequency domain; or
   on Uu interface, a SR resource used for the Uu interface and a SR resource used for the Sidelink interface are isolated in a time domain and/or frequency domain.

6. The method of claim 1, further comprising:
   reporting, by the user equipment, auxiliary information to the network side, the auxiliary information is used by the network side to configure the mapping relationship.

7. The method of claim 6, wherein the auxiliary information comprises one or a combination of:
   QoS parameters corresponding to a current logical channel of the Sidelink interface of the user equipment; or
   QoS parameters corresponding to a current logical channel of the Sidelink interface of the user equipment and a Sidelink Destination ID.

8. The method of claim 1, wherein determining the SR resource of the Uu interface to be used according to the logical channel of the Sidelink interface that triggers the SR and the mapping relationship, comprises:
   when a Regular Sidelink BSR is triggered by expiry of a retxBSR-Timer, then selecting a Sidelink logical channel that has data to be transmitted currently and has a highest priority as the logical channel of the Sidelink interface that triggers the SR.

9. The method of claim 1, wherein when the user equipment has a plurality of Sidelink logical channels that trigger SRs and the plurality of Sidelink logical channels correspond to different SR resources, the SR resource is selected in one of following ways:
   when multiple SR resources are allowed to be selected, using different SR resources corresponding to the plurality of Sidelink logical channels for SRs; or
   when only one SR resource is allowed to be used, selecting according to a following principle:
   selecting a Sidelink logical channel that triggers an SR currently and has a highest priority, and determining the SR resource according to QoS parameters of the selected Sidelink logical channel and the mapping relationship; or, after selecting QoS parameters of a Sidelink logical channel that triggers an SR currently, selecting a SR resource closest to a current time among SR resources corresponding to the selected QoS parameters.

10. A method for configuring SR transmitting resource, comprising:
    configuring, by a network side, a mapping relationship between QoS parameters of a Sidelink interface and SR resources of a Uu interface; wherein the mapping relationship is a mapping relationship between QoS parameters corresponding to a destination identifier and SR resources of the Uu interface;
    notifying, by the network side, the mapping relationship to a user equipment, wherein the mapping relationship is used by the user equipment to determine a corresponding destination identifier according to a Sidelink logical channel that triggers an SR, and determine an SR resource to be used according to a mapping relationship between QoS parameters corresponding to the destination identifier and SR resources of the Uu interface.

11. The method of claim 10, wherein the QoS parameters of the Sidelink interface are one or a combination of:
    PPPP, PPPR, PDB, other QoS parameters introduced for the Sidelink interface in subsequent protocol versions of R15.

12. The method of claim 10, wherein the SR resource is a time/frequency-domain resource, or a time/frequency-domain resource indicated by a time/frequency-domain resource index.

13. The method of claim 10, wherein an SR resource allocation mode on the Uu interface is:
    on Uu interface, a SR resource used for the Uu interface and a SR resource used for the Sidelink interface are not distinguished in a time domain and/or frequency domain; or
    on Uu interface, a SR resource used for the Uu interface and a SR resource used for the Sidelink interface are isolated in a time domain and/or frequency domain.

14. The method of claim 10, further comprising:
after receiving auxiliary information reported by the user equipment to the network side, configuring, by the network side, the mapping relationship based on the auxiliary information.

15. The method of claim 14, wherein the auxiliary information comprises one or a combination of:
QoS parameters corresponding to a current logical channel of the Sidelink interface of the user equipment; or
QoS parameters corresponding to a current logical channel of the Sidelink interface of the user equipment and a Sidelink Destination ID.

16. A user equipment, comprising:
a processor configured to read programs in a memory to perform the process of:
after receiving a mapping relationship between QoS parameters of a Sidelink interface and Scheduling Request, SR, resources of a Uu interface configured by a network side, determining whether the Sidelink interface triggers an SR, and when the SR is triggered, then determining a SR resource of the Uu interface to be used according to a logical channel of the Sidelink interface that triggers the SR and the mapping relationship;
a transceiver configured to receive and transmit data under control of the processor;
wherein the mapping relationship is a mapping relationship between QoS parameters corresponding to a destination identifier and SR resources of the Uu interfaced;
wherein determining the SR resource of the Uu interface to be used according to the logical channel of the Sidelink interface that triggers the SR and the mapping relationship, comprises:
determining a corresponding destination identifier according to a Sidelink logical channel that triggers the SR, and determining the SR resource to be used according to a mapping relationship between QoS parameters corresponding to the destination identifier and SR resources of the Uu interface.

17. A base station, comprising:
a processor configured to read programs in a memory to perform the process of:
configuring a mapping relationship between QoS parameters of a Sidelink interface and SR resources of a Uu interface; wherein the mapping relationship is a mapping relationship between QoS parameters corresponding to a destination identifier and SR resources of the Uu interface
a transceiver configured to receive and transmit data under control of the processor to perform the process of:
notifying the mapping relationship to a user equipment, wherein the mapping relationship is used by the user equipment to determine a corresponding destination identifier according to a Sidelink logical channel that triggers an SR, and determine an SR resource to be used according to a mapping relationship between QoS parameters corresponding to the destination identifier and SR resources of the Uu interface.

* * * * *